Figure 1:
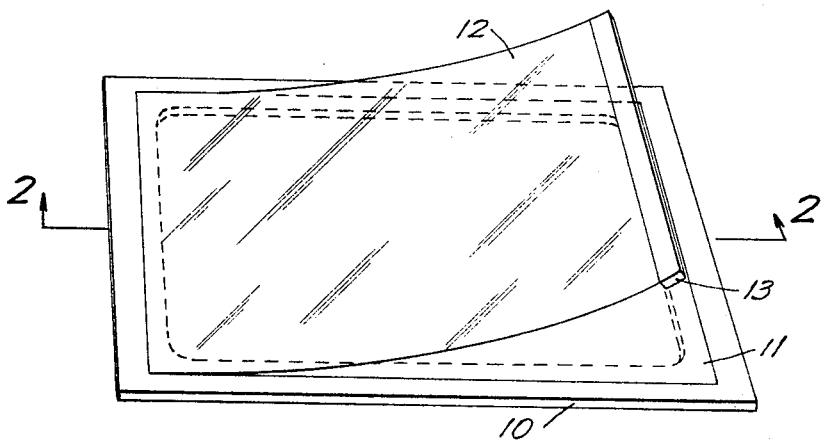

Oct. 25, 1966     D. J. NEWMAN     3,280,493

RE-USABLE PRESSURE-MARKING PROJECTION TRANSPARENCY DEVICE

Filed Oct. 26, 1964

INVENTOR.
DONALD J. NEWMAN
BY
Carpenter, Abbott, Coulter & Kinney
ATTORNEYS

3,280,493
RE-USABLE PRESSURE-MARKING PROJECTION TRANSPARENCY DEVICE
Donald J. Newman, White Bear Lake, Minn., assignor to Minnesota Mining & Manufacturing Company, St. Paul, Minn., a corporation of Delaware
Filed Oct. 26, 1964, Ser. No. 406,416
5 Claims. (Cl. 40—158)

This invention relates to the projection of light-images. More specifically, the invention provides means for preparing projection transparencies particularly for use with overhead projectors.

Educators, lecturers, designers and others have found overhead projectors convenient and helpful in teaching, demonstrating, and for various other purposes. The projector generally is in the form of a projection lens assembly mounted above a flat horizontal transparent stage surmounting a light source including a condensing lens system. Light passes from the source through a transparency laid on the stage, through the projection head, and to a viewing screen. The operator may use prepared transparencies, or may produce any desired message or pattern on a transparent film, for example using a wax pencil, while his audience views the process on the screen.

The present invention provides a sheet material on which projection transparencies may be produced using a simple stylus if desired. The resulting imaged area is transparent whereas the sheet material is light-diffusing, so that the image appears on the viewing screen as bright lines against a dark background. Markings are easily erased or removed, the sheet then being available for repeated use.

Figure 2:
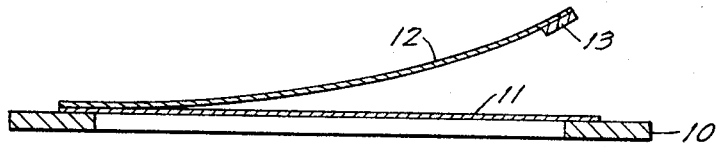
Figure 3:
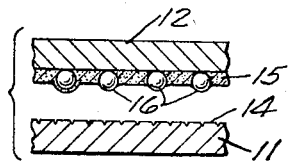

In the drawing,

FIGURE 1 is a view in perspective of a projection transparency sheet material according to the invention, FIGURE 2 is an elevation in section taken along line 2—2 of FIGURE 1, and FIGURE 3 is an enlarged fragmentary portion of FIGURE 2 showing additional structural details.

The device consists essentially of a frame 10 covered with a translucent base film 11 above which is fastened at one end a translucent adherent cover 12 having a handle 13 at the free end. In a typical structure, the frame 10 is of heavy cardboard. The film 11 is a thin film of transparent plastic having a rough embossed upper surface 14. The cover 12 is a tough transparent polymeric film coated on the bottom surface with a layer of pressure sensitive adhesive 15 having a large number of non-tacky surface protuberances 16, which in FIGURE 3 are illustrated as fragile hollow spheroids.

The combination of the embossed surface 14 of the film 11 and the optically discontinuous adhesive layer 15 on film 12 imparts to the structure a degree of translucency or light diffusivity sufficient to prevent any substantial portion of the incident light rays from reaching the viewing screen through the overhead projector system. As a result, placing the sheet material over the stage of the projector results in an overall darkening at the viewing screen.

The presence of the protuberances 16 at the adhesive surface 15 effectively prevents the cover member from adhering to the supporting film 11 under any normal handling. The cover may be smoothed by hand and lightly pressed into position without having any visible effect at the viewing screen. Subjecting the cover to localized moderately high pressure, however, results in flattening of the affected protrusions, adherent contact between the adhesive layer and the film 11, and filling of the rugosities of the embossed surface 14 to provide a clear transparent optical path through the composite and permit the appearance of a corresponding bright line on the viewing screen.

Although the adhesive becomes firmly bonded to the embossed film when thus pressed into place, the bond is restricted to those areas directly subjected to pressure and the resulting light image therefore is sharply defined. The limited area of bond makes possible the effective removal of the adhesive coated cover from the embossed underlayer when desired, this being accomplished by stripping the cover from the underlayer by tension applied at the handle member 13. The adhesive is completely removed from the surface rugosities, and light transmission at these areas is thereby again effectively prevented. The device may therefore be re-used in making a large number of projection transparencies, being limited only by the eventual flattening or elimination of such a major portion of the protuberances 16 as to permit firm adhesive contact between the two films at undesired areas.

The edges of the film 11 and the end portion of the film 12 may be adhered directly to the underlaying support by means of suitable adhesives applied to one or both of the areas involved. A somewhat simpler construction involves fastening the sheets to the frame by means of transparent pressure-sensitive adhesive tape. Or, in the case of the cover, the latter may be directly adhered to the underlying film 11 and to the handle member 13 by its adhesive layer 15, sufficient pressure being applied to overcome the separating effect of the protuberances.

A particularly desirable plastic film to serve as the film 11 consists of a polypropylene film having a matte finish prepared by pressure contact of the warmed film with a uniformly roughened non-adherent pressure roller.

Polypropylene resin has a readily releasable surface characterisitic, thus permitting the pressure-sensitive adhesive to be removed therefrom without difficulty and without any requirement of additional surface treatments. Other films may be substituted for the polypropylene. Cellulose acetate film is one such material which is readily available with a matte surface and may be lighted treated with an adhesive release agent, e.g. and acrylate or urethane low adhesion backsize material, if necessary for the easy removal of the adhesive coated cover.

Various other matte surface films produced from different materials and by different processes are also useful. Thus the polymeric film may be given a surface roughness by abrasion or sandblasting, or by solvent attack, or by the application of other coatings which dry with a rough surface characteristic.

The degree of roughness of the matte surface should be sufficient to cause adequate diffusion of light so that a high degree of contrast may be obtained at the viewing screen, while still permitting transparentization of the system by plastic flow of the pressure-sensitive adhesive into the surface rugosities. The applicable degree of roughness therefore will be seen to depend also on the properties of the adhesive coating. One type of pressure-sensitive adhesive which has given excellent results consists of a pressure-sensitive vinyl ether polymer applied from solution in heptane and isopropyl alcohol. Another useful adhesive is pressure-sensitive adhesive copolymer of octyl acrylate with a small proportion of acrylic acid, likewise applied from solution in an organic solvent mixture. Other transparent normally tacky pressure-sensitive adhesive compositions are also useful. Where desired, a coating of transparent adhesive priming material may first be applied to the cover film so as to prevent any possibility of adhesive offsetting when the cover is stripped from the matte finish base film 11. The transparent film covering material must be sufficiently hard and tough to avoid ripping or scratching under the application of pressure with a stylus or other marking implement. The necessary properties are provided by films such as "Mylar" polyester film or others of equivalent clarity, hardness and toughness.

A preferred form of protuberances as illustrated in FIGURE 3 consists of a large number of fragile hollow glass bubbles or spheroids either applied over the adhesive surface or incorporated in the adhesive prior to coating. In the latter case a thin coating of the adhesive may remain over the protruding surfaces of the spheroids, but the extreme thinness of this coating combined with the small area of contact renders the extended tip substantially tack-free and permits non-adherent contact of the pebbled bead-filled adhesive surface with the adhesive receptive matte finished surface of the film 11. In another form of the invention, the adhesive layer may itself be produced with a large number of extended surface protuberances which are covered over the extended tips with a thin destructible surface coating of non-adhesive material, e.g. sodium silicate, inert resin or the like. As an example of a preferred concentration and dimension of protuberances, it is found that the addition to the pressure-sensitive adhesive of about one-half to about 1½ percent by weight of thin glass spheroids having a density of about 0.2 to about 0.4 gm./cc. and within a size range of about 25 to about 150 microns provides substantially complete slidability of the coated surface over the uncoated base while permitting fully adherent bonding upon the application of localized pressure when the adhesive mixture is applied at a coating weight between about one and about three grams per square foot.

The matte surface and protected adhesive surface may be interchanged if desired.

What is claimed is as follows:

1. A projection transparency device comprising a transparent base film having a matte finish light-diffusing surface, and, substantially coextensive therewith, a cover film comprising a clear transparent hard tough polymeric film coated on the surface adjacent the base film with a thin layer of transparent normally tacky pressure-sensitive adhesive having a large number of non-tacky fragile protuberances at the exposed surface thereof the protuberances being capable of being flattened to permit transparentization of the system when the device is subjected to localized pressure.

2. A projection transparency device comprising a centrally open flat frame, a base film of transparent material covering the central opening of said frame and having a rugose light-diffusing surface, and a flexible cover member substantially coextensive with said base film and adjacent said rugose surface and consisting essentially of a clear transparent hard tough polymeric film coated on the surface adjacent said base film with a thin layer of transparent normally tacky pressure-sensitive adhesive having a large number of non-tacky fragile protuberances at the exposed surface thereof the protuberances being capable of being flattened to permit transparentization of the system when the device is subjected to localized pressure.

3. A projection transparency device comprising a centrally open thin flat frame, a base film of transparent polymeric material covering the central opening of said frame and adherently bonded along the peripheral area to the surface of said frame, a flexible cover film of transparent polymeric material substantially coextensive with said base film and adherently bonded along one edge area to the corresponding edge area of said frame and said base film, a reinforcing strip adherently bonded to an edge of said cover film opposite said one edge, one of said base film and said cover film having a matte finish light-diffusing surface, the other of said base film and said cover film carrying a thin coating of transparent normally tacky and pressure-sensitive adhesive facing said light-diffusing surface and having a large number of non-tacky fragile protuberances at the exposed surface for preventing plastic adhesive contact with said light-diffusing surface under contact pressures less than sufficient to eliminate said protuberances the protuberances being capable of being flattened to permit transparentization of the system when the device is subjected to localized pressure.

4. A device as described in claim 3 in which said protuberances comprise small fragile hollow glass spheroids.

5. A device as described in claim 4 in which said spheroids have a particle size within the approximate range of 25 to 150 microns and a density of about 0.2 to about 0.4 gram/cc., and are present to the extent of about ½ to about 1½ percent based on the weight of the adhesive and the adhesive coating weighs about one to about three grams per sq. ft.

References Cited by the Examiner

UNITED STATES PATENTS

| 2,074,855 | 3/1937 | Paasche | 35—66 |
| 2,917,838 | 12/1959 | Neugass | 35—66 |
| 3,032,355 | 5/1962 | Zalkind | 282—22 |

FOREIGN PATENTS

| 343,742 | 2/1931 | Great Britain. |

EUGENE R. CAPOZIO, *Primary Examiner.*